(12) United States Patent
Chiba et al.

(10) Patent No.: US 6,978,605 B2
(45) Date of Patent: Dec. 27, 2005

(54) EXHAUST EMISSION CONTROL SYSTEM FOR ENGINE

(75) Inventors: Shosaku Chiba, Saitama (JP); Akihito Kasai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 10/689,521

(22) Filed: Oct. 21, 2003

(65) Prior Publication Data

US 2004/0134188 A1   Jul. 15, 2004

(30) Foreign Application Priority Data

Oct. 30, 2002   (JP) .............................. 2002-315480

(51) Int. Cl.$^7$ ................................................ F01N 3/10
(52) U.S. Cl. .......................... 60/302; 60/289; 60/290; 60/293; 60/308; 181/231; 181/240; 181/258; 181/272; 181/283
(58) Field of Search .................... 60/289, 290, 293, 60/300, 301, 302, 308; 181/230, 231, 240, 181/258, 259, 262, 263, 265, 269, 272, 282, 181/283

(56) References Cited

U.S. PATENT DOCUMENTS

| | | | | |
|---|---|---|---|---|
| 4,049,388 A | * | 9/1977 | Scheitlin et al. | ............. 422/171 |
| 5,055,274 A | * | 10/1991 | Abbott | ........................ 422/171 |
| 5,285,640 A | * | 2/1994 | Olivo | ........................ 60/274 |
| 5,611,198 A | * | 3/1997 | Lane et al. | ..................... 60/299 |
| 5,732,555 A | | 3/1998 | Gracyalny et al. | |
| 5,738,184 A | * | 4/1998 | Masuda et al. | ............. 181/262 |
| 5,902,971 A | | 5/1999 | Sato et al. | |
| 6,442,933 B2 | * | 9/2002 | Rusch | ........................ 60/286 |

FOREIGN PATENT DOCUMENTS

| | | |
|---|---|---|
| JP | 9-273419 | 10/1997 |
| JP | 11-303623 | 11/1999 |

OTHER PUBLICATIONS

WO 98/02649 published Jan. 22, 1998.

* cited by examiner

*Primary Examiner*—Binh Q. Tran
(74) *Attorney, Agent, or Firm*—Arent Fox PLLC

(57) ABSTRACT

In an exhaust emission control system for an engine, comprising an exhaust emission control catalyst disposed in an exhaust muffler whose inside is divided into a plurality of chambers, at least a portion of the inside of the exhaust muffler is divided into a first chamber for converting mainly NOx in exhaust gas and a second chamber for converting HC and CO in the exhaust gas. The exhaust muffler comprises: a partition wall having a conduit for guiding the exhaust gas from the first chamber to the second chamber; an exhaust gas inlet for introducing the exhaust gas into the first chamber; an external-air suction means for sucking external air into the second chamber; and a discharge pipe for discharging the external air and the exhaust gas flowing through the second chamber.

5 Claims, 4 Drawing Sheets

EXHAUST EMISSION CONTROL SYSTEM FOR ENGINE

BACKGROUND OF THE INVENTION

1. Field of the Invention

The present invention relates to an exhaust emission control system for an engine, comprising an exhaust emission control catalyst disposed in an exhaust muffler whose inside is divided into a plurality of chambers.

2. Description of the Related Art

An exhaust emission control system including an exhaust emission control catalyst disposed in an exhaust muffler whose inside is divided into a plurality of chambers, is already known, for example, from Japanese Patent Application Laid-open No. 11-303623.

NOx, HC and CO are contained as components to be converted in an exhaust gas from an engine, and an exhaust emission control catalyst promotes reduction reaction of NOx and oxidation reaction of HC and CO. There is an exhaust emission control system already known, for example, from Japanese Patent Application Laid-open No. 9-273419, which is designed so that external air is introduced into an exhaust muffler in order to promote oxidation reaction by making up for the shortage of an amount of oxygen contained in an exhaust gas.

In the exhaust emission control system disclosed in Japanese Patent Application Laid-open No. 9-273419, the inside of the exhaust muffler is divided into a first chamber into which the exhaust gas from the engine is introduced and a second chamber leading to an exhaust gas discharge port, and the external air is introduced into the first chamber. However, in a state in which an amount of oxygen is large, the reduction reaction of NOx in the exhaust gas does not advance. Therefore, in the conventional technique in which the external air is introduced immediately into the exhaust gas which is introduced from the engine into the exhaust muffler, it is difficult to sufficiently convert NOx.

SUMMARY OF THE INVENTION

Accordingly, it is an object of the present invention to provide an exhaust emission control system for an engine, wherein NOx, HC and CO in an exhaust gas can be converted effectively.

To achieve the above object, according to the present invention, there is provided an exhaust emission control system for an engine, comprising an exhaust emission control catalyst disposed in an exhaust muffler whose inside is divided into a plurality of chambers, wherein at least a portion of the inside of the exhaust muffler is divided into a first chamber for converting mainly NOx in exhaust gas and a second chamber for converting HC and CO in the exhaust gas, and is provided with a partition wall having a conduit for guiding the exhaust gas from the first chamber to the second chamber, and wherein the exhaust muffler comprises: an exhaust gas inlet for introducing the exhaust gas into the first chamber; an external-air suction means for sucking external air into the second chamber; and a discharge pipe for discharging the external air and the exhaust gas flowing through the second chamber.

With this arrangement, the reduction treatment mainly for NOx can be carried out in the first chamber in consideration of the fact that the content of oxygen in the exhaust gas introduced from the engine into the first chamber is relatively small, and the oxidation treatment for HC and CO can be promoted utilizing the effect that the content of oxygen is increased by the production of oxygen in the reduction treatment and by sucking the external air through the external-air suction means. Therefore, NOx, HC and CO in the exhaust gas can be converted effectively.

The above and other objects, features and advantages of the invention will become apparent from the following description of the preferred embodiment taken in conjunction with the accompanying drawings.

DESCRIPTION OF THE PREFERRED EMBODIMENT

Figure 1:
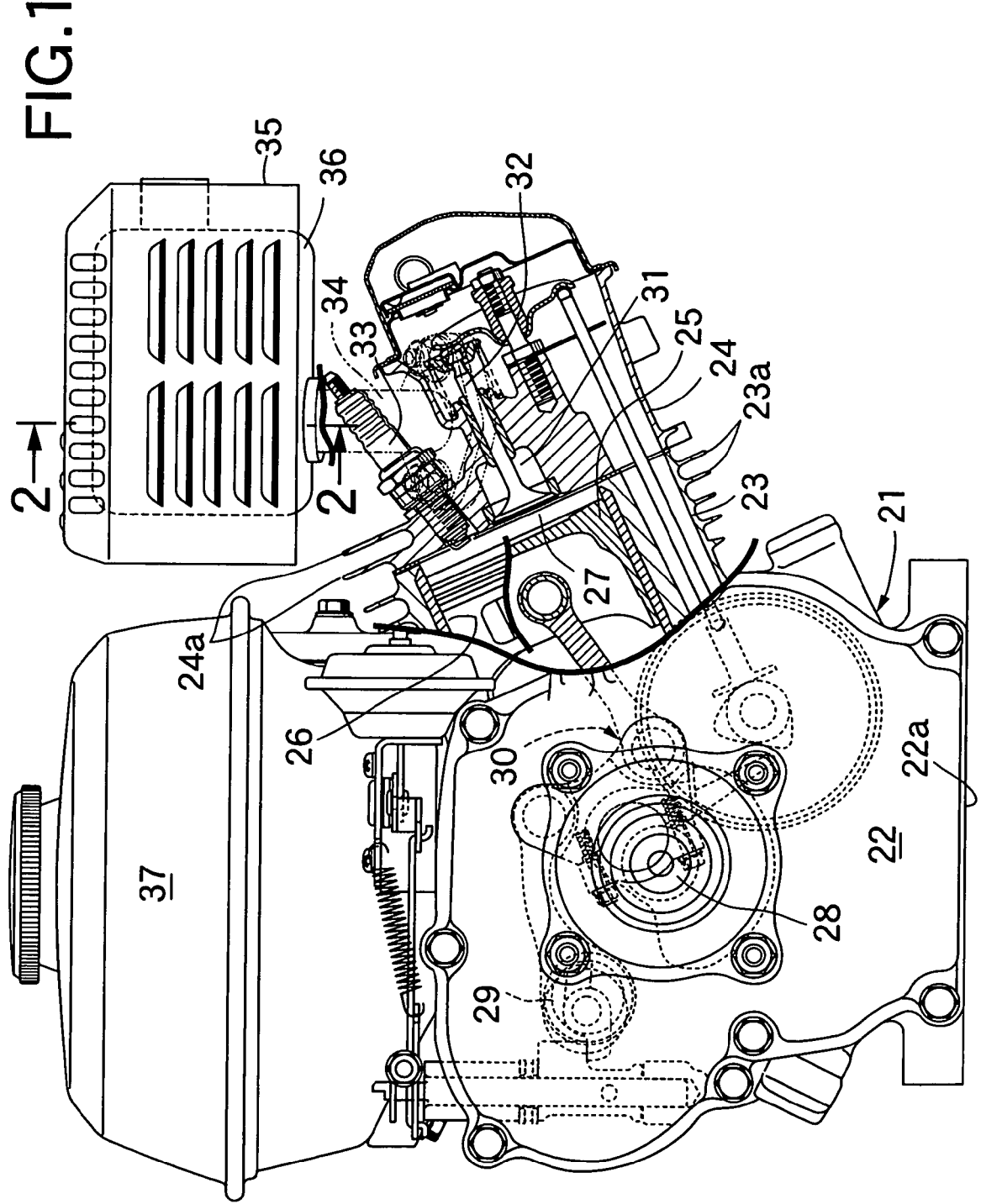
FIG. 1 is a partially cutaway front view of a portion of an general-purpose engine.

The present invention will now be described by way of a preferred embodiment with reference to FIGS. 1 to 4. Referring first to FIG. 1, a general-purpose engine is an air-cooled single-cylinder engine used, for example, in a working machine or the like, and has an engine body 21 which comprises: a crankcase 22; a cylinder block 23 slightly inclined upwards and protruding from one side of the crankcase 22; and a cylinder head 24 coupled to a head of the cylinder block 23. A large number of air-cooling fins 23a and 24a are provided on outer surfaces of the cylinder block 23 and the cylinder head 24. The crankcase 22 is installed on a cylinder head of any working machine via an installation surface 22a of its lower face.

A cylinder bore 26 is formed in the cylinder block 23, and slidably receives therein a piston 25. A combustion chamber 27 is formed between the cylinder block 23 and the cylinder head 24, so that a top of the piston 25 faces the combustion chamber 27.

The piston 25, a crankshaft 28 rotatably carried in the crankcase 22, and a support shaft 29 which is carried in the crankcase 22 of the engine body 21 and which can be displaced in a plane perpendicular to the axis of the crankshaft 28, are connected to one another through a link mechanism 30. Therefore, the compression ratio of the engine is changed by changing the position of the support shaft 29 in the plane perpendicular to the axis of the crankshaft 28.

An intake port 31 and an exhaust port (not shown) capable of leading to the combustion chamber 27 are formed in the cylinder head 24. Disposed in the cylinder head 24 are an intake valve 32 openable and closable for providing connection and disconnection between the intake port 31 and the combustion chamber 27 as well as an exhaust valve (not shown) openable and closable for providing connection and disconnection between the exhaust port and the combustion chamber 27. A spark plug 33 is threadedly mounted to the cylinder head 24 with its electrodes facing the combustion chamber 27.

An exhaust pipe 34 leading to the exhaust port is connected to an upper portion of the cylinder head 24, and also connected to an exhaust muffler 36 covered with a cover 35. Further, a fuel tank 37 is disposed above the crankcase 22, so that it is supported on the crankcase 22.

Figure 2:
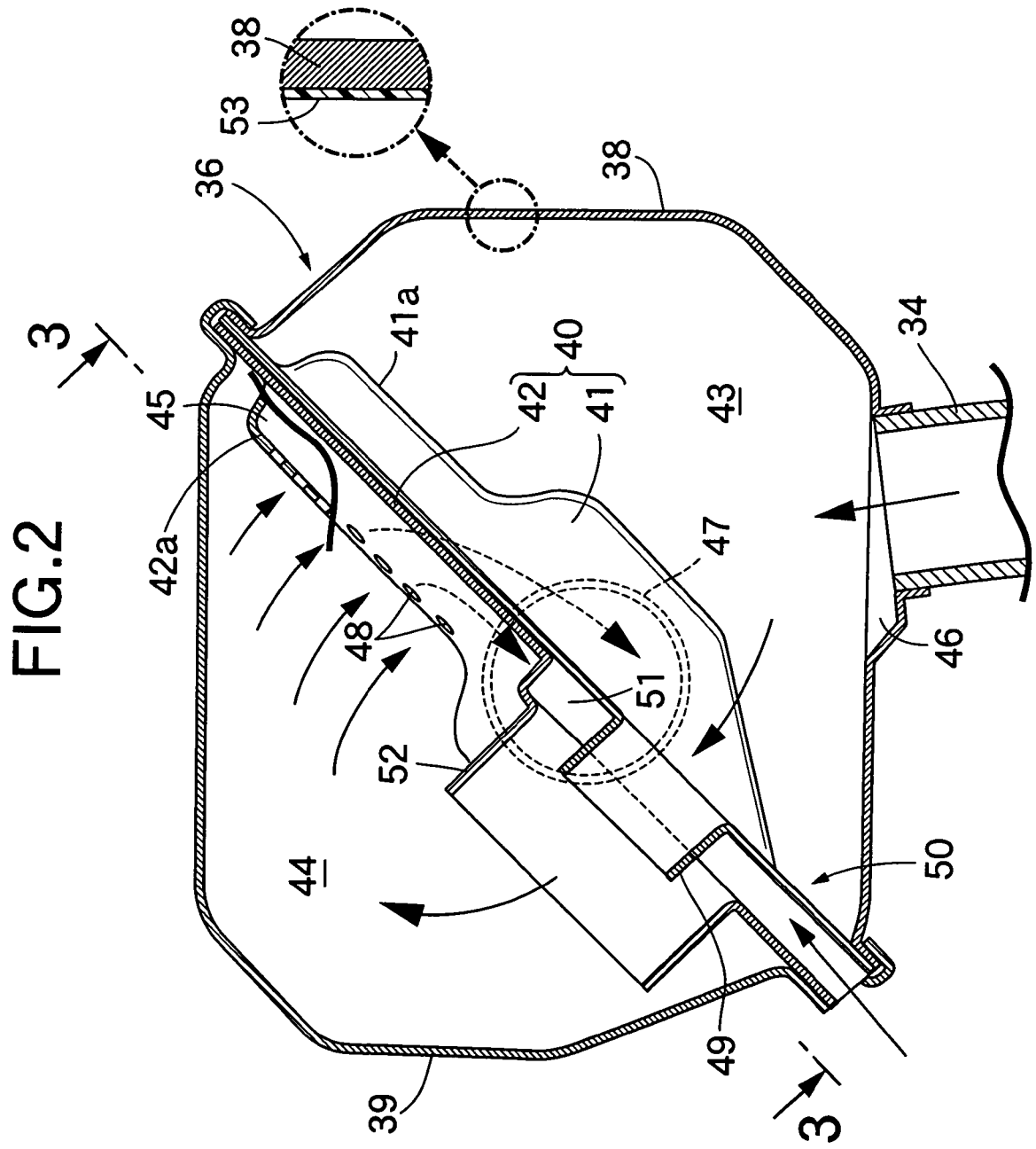
FIG. 2 is a sectional view taken along a line 2—2 in FIG. 1.
Figure 3:
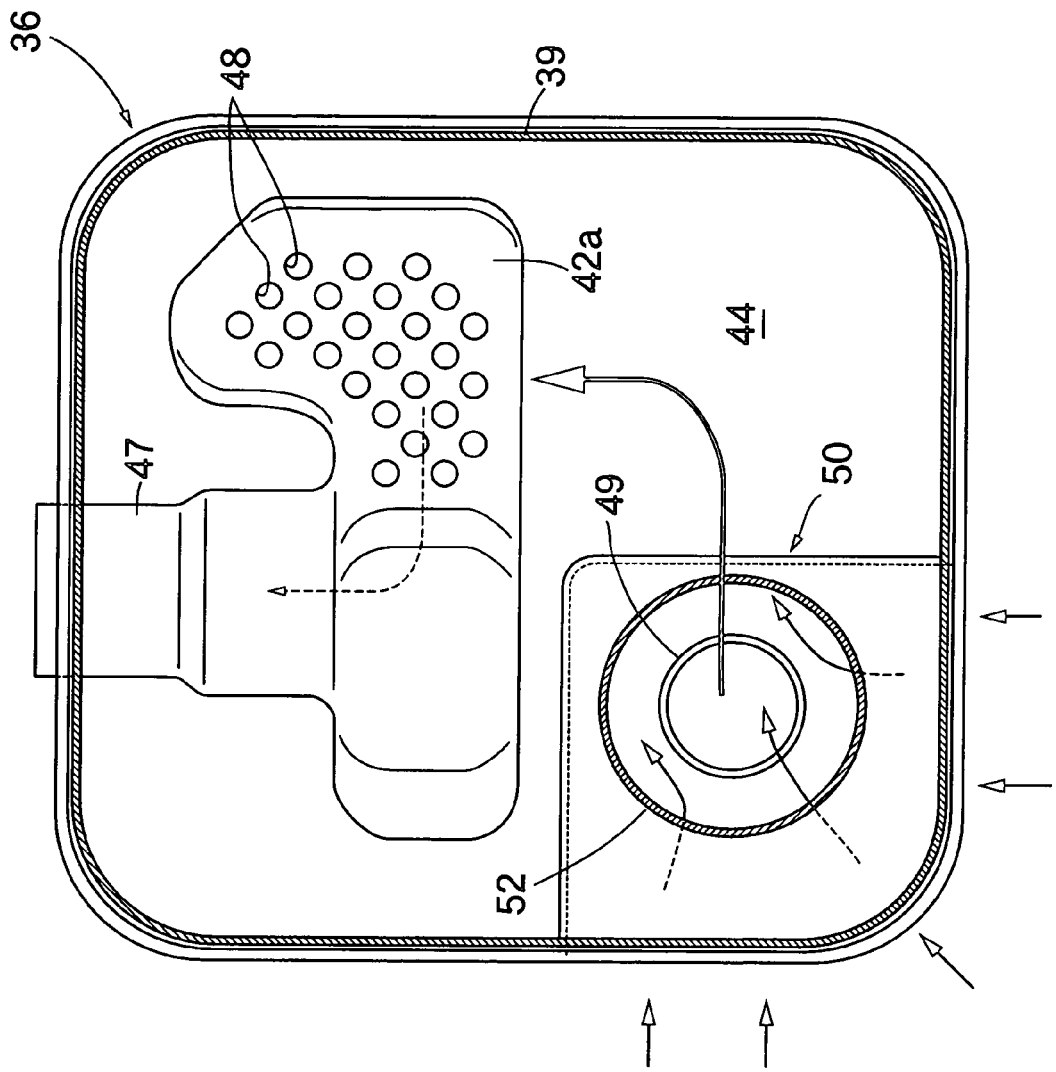
FIG. 3 is a sectional view taken along a line 3—3 in FIG. 2.
Figure 4:
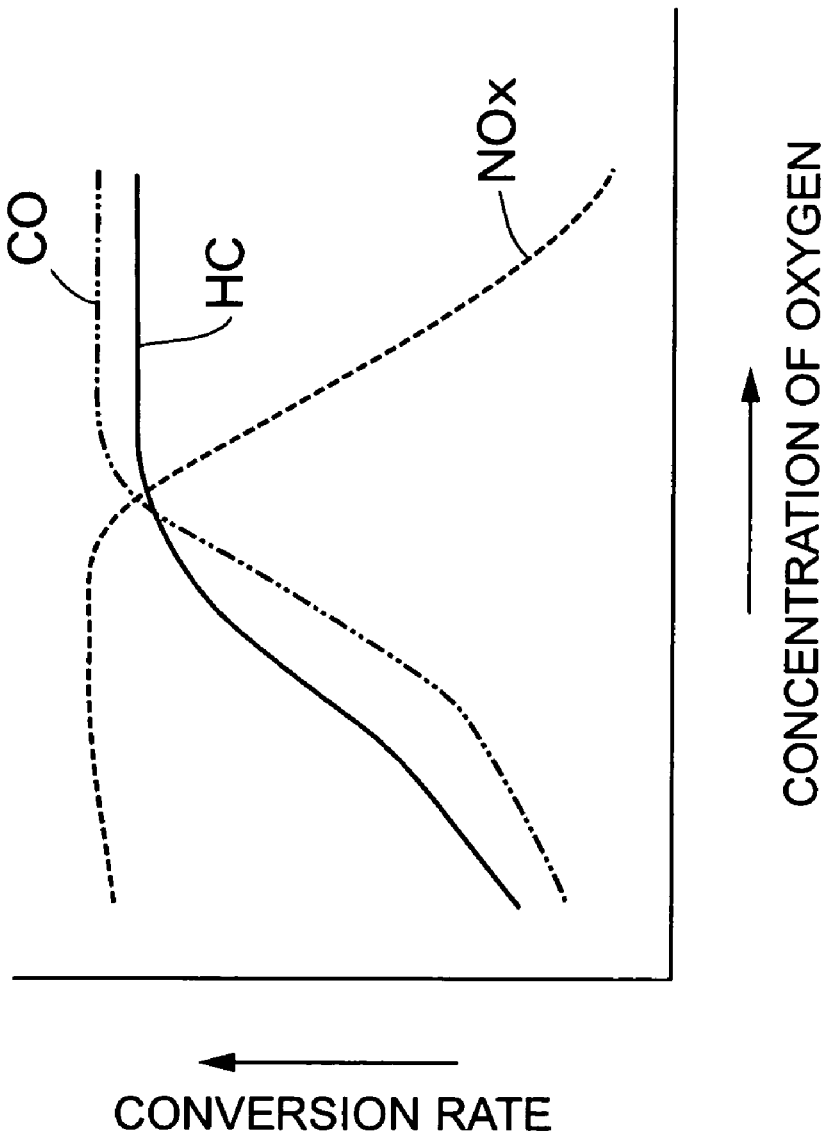
FIG. 4 is a graph showing changes of the conversion rate with respect to the air-fuel ratio.

Referring to FIGS. 2 and 3, the exhaust muffler 36 comprises first and second case members 38 and 39 each of which is formed into a bowl shape and whose opening edges are bonded together by crimping to clamp a peripheral edge of a partition wall 40 between them. The partition wall 40 comprises a pair of partition plate members 41 and 42 superposed on each other.

The inside of the exhaust muffler 36 is divided by the partition wall 40 into a first chamber 43 for converting mainly NOx in exhaust gas and a second chamber 44 for converting HC and CO in the exhaust gas, and a third chamber 45 is defined between the partition plate members 41 and 42 of the partition wall 40.

The first case member 38 of the exhaust muffler 36 is provided with an exhaust gas inlet 46 to which the exhaust pipe 34 is connected, so that the exhaust gas guided from the engine through the exhaust pipe 34 is introduced into the first chamber 43.

Bulges 41a and 42a swelled to opposite sides are formed on portions of the first and second partition plate members 41 and 42, respectively. The third chamber 45 is defined by the bulges 41a and 42a, and an exhaust pipe 47 leading to the third chamber 45 is formed by the bulges 41a and 42a. The exhaust pipe 47 protrudes to the outside from coupled portions of the first and second case members 38 and 39. A plurality of small bores 48 are provided in the bulge 42 of the second partition plate member 42, to permit the second chamber 44 to communicate with the third chamber 45, so that the exhaust gas is guided from the second chamber 44 through the small bores 48 into the third chamber 45, and discharged through the exhaust pipe 47 to the outside.

A conduit 49 for guiding the exhaust gas from the first chamber 43 to the second chamber 44 is integrally provided on the first partition plate member 41 of the partition wall 40, at a location offset from the third chamber 45, to protrude toward the second chamber 44, so that the exhaust gas is guided through the conduit 49 to the second chamber 44.

The exhaust muffler 36 includes an external-air suction means 50 for sucking external air into the second chamber 44. The external-air suction means 50 comprises: an external-air introduction chamber 51 which is defined between the first and second partition plate members 41 and 42 of the partition wall 40 to coaxially surround the conduit 49 and lead to the outside; and a suction tube 52 integrally provided on the second partition plate member 42 to communicate with the external-air introduction chamber 51. The external-air suction means 50 ensures that the external air outside the exhaust muffler 36 is sucked into the second chamber 44 by a negative pressure generated around the conduit 49, i.e., in the suction tube 52 when the exhaust gas in the first chamber 43 is ejected vigorously from the conduit 49 into the second chamber 44.

In such exhaust muffler 36, an exhaust emission control catalyst 53 is applied to inner surfaces of the first and second case members 38 and 39. A ternary catalyst promoting the reduction reaction of NOx in the exhaust gas and the oxidation reaction of HC and CO in the exhaust gas, can be suitably used as the exhaust emission control catalyst 53.

The conversion rates of NOx, HC and CO change depending on the concentration of oxygen in the exhaust gas. When the concentration of oxygen is low, the conversion rate of NOx can be increased, but the conversion rates of HC and CO are decreased. When the concentration of oxygen is high, the conversion rates of HC and CO can be increased, but the conversion rate of NOx is decreased. Because the concentration of oxygen in the first chamber 43 into which the exhaust gas is introduced directly from the engine is relatively low, the first chamber 43 is used to convert mainly NOx in the exhaust gas. Because the external air is sucked into the second chamber 44, and oxygen produced by the reduction reaction of NOx is also contained in the exhaust gas, so that the concentration of oxygen in the second chamber 44 becomes relatively high, the second chamber 44 is used to convert the HC and CO in the exhaust gas.

In this manner, the reduction treatment mainly for NOx can be carried out in the first chamber 43 in consideration of the fact that the content of oxygen in the exhaust gas introduced from the engine into the first chamber 43 is relatively low, and the oxidation treatment of HC and CO can be promoted in the second chamber 44 by utilizing the effect that the content of oxygen is increased to a relatively large value by the production of oxygen in the reduction treatment and by the suction of the external air through the external-air suction means 50. Therefore, NOx, HC and CO in the exhaust gas can be converted effectively.

Although the embodiment of the present invention has been described in detail, it will be understood that the present invention is not limited to the above-described embodiment, and various modifications in design may be made without departing from the spirit and scope of the invention defined in the claims.

For example, the example using the ternary catalyst as the exhaust emission control catalyst 53 has been described in the embodiment, but a reduction catalyst may be used in a section facing the first chamber 43 for converting mainly NOx in the exhaust gas, and an oxidation catalyst may be used in a section facing the second chamber 44 for converting HC and CO in the exhaust gas.

What is claimed is:

1. An exhaust emission control system for an engine, comprising an exhaust emission control catalyst disposed in an exhaust muffler whose inside is divided into a plurality of chambers,
   wherein at least a portion of the inside of the exhaust muffler is divided into:
      a first chamber as one of a plurality of chambers, the first chamber converting mainly NOx in exhaust gas;
      a second chamber as another of the plurality of chambers, the second chamber converting HC and CO in the exhaust gas, and
      a partition wall disposed between the first and second chambers and having a conduit for guiding the exhaust gas from the first chamber to the second chamber, and
   wherein the exhaust muffler comprises:
      an exhaust gas inlet for introducing the exhaust gas into the first chamber;
      an external-air suction means provided in the partition wall for sucking external air into the second chamber; and
      a discharge pipe for discharging the external air and the exhaust gas flowing through the second chamber.

2. The exhaust emission control system according to claim 1, wherein the external-air suction means comprises an external-air introduction chamber formed to surround the conduit and connected to an outside atmosphere.

3. The exhaust emission control system according to claim 2, wherein the external-air suction means further comprises a suction tube communicating with the external-air introduction chamber and coaxially surrounding the conduit.

4. The exhaust emission control system according to claim 1, wherein the partition wall comprises first and second partition plate members superposed on each other.

5. The exhaust emission control system according to claim 4, wherein the conduit is integrally provided on the first partition plate member.

* * * * *